(12) United States Patent
Kitaj et al.

(10) Patent No.: US 7,290,144 B1
(45) Date of Patent: Oct. 30, 2007

(54) ACCESS-CONTROL METHOD FOR SOFTWARE MODULES AND PROGRAMMABLE ELECTRONIC DEVICE THEREFOR

(76) Inventors: Paul Thomas Kitaj, 1214 W. Straford Ave., Gilbert, AZ (US) 85233; Sherman W. Paskett, 8479 E. Pierce St., Scotsdale, AZ (US) 85257; Douglas Allan Hardy, 10705 E. Laurel La., Scottsdale, AZ (US) 85259; Frank Edward Seeker, 6329 W. Hill La., Glendale, AZ (US) 85310; Steve Robert Tugenberg, 10210 N. 77th St., Scottsdale, AZ (US) 85258

(*) Notice: Subject to any disclaimer, the term of this patent is extended or adjusted under 35 U.S.C. 154(b) by 861 days.

(21) Appl. No.: 10/177,555

(22) Filed: Jun. 21, 2002

(51) Int. Cl.
*H04K 1/00* (2006.01)
*H04N 7/16* (2006.01)

(52) U.S. Cl. ............ 713/182; 713/185; 380/44; 726/26

(58) Field of Classification Search ............... 713/191
See application file for complete search history.

(56) References Cited

U.S. PATENT DOCUMENTS

| | | | |
|---|---|---|---|
| 4,944,008 A | 7/1990 | Piosenka et al. | 380/46 |
| 5,179,591 A | 1/1993 | Hardy et al. | 380/21 |
| 5,195,136 A | 3/1993 | Hardy et al. | 380/43 |
| 5,208,859 A | 5/1993 | Bartucci et al. | 380/45 |
| 5,222,133 A * | 6/1993 | Chou et al. | 705/55 |
| 5,230,020 A | 7/1993 | Hardy et al. | 380/21 |
| 5,341,426 A | 8/1994 | Barney et al. | 380/21 |
| 5,341,427 A | 8/1994 | Hardy et al. | 380/21 |
| 5,615,266 A | 3/1997 | Altschuler et al. | 380/21 |
| 5,623,546 A | 4/1997 | Hardy et al. | 380/4 |
| 5,671,412 A * | 9/1997 | Christiano | 707/104.1 |
| 5,771,347 A * | 6/1998 | Grantz et al. | 726/31 |
| 5,880,523 A | 3/1999 | Candelore | 257/679 |
| 5,915,025 A | 6/1999 | Taguchi et al. | |
| 5,946,399 A | 8/1999 | Kitaj et al. | 380/49 |
| 5,995,628 A | 11/1999 | Kitaj et al. | 380/49 |
| 6,031,912 A | 2/2000 | Moulart et al. | 380/44 |

(Continued)

OTHER PUBLICATIONS

Dictionary.com, encrypt (defined) <http://dictionary.reference.com/search?q=encrypt> retrieved online May 16, 2006.*

*Primary Examiner*—Kambiz Zand
*Assistant Examiner*—Thomas Szymanski
(74) *Attorney, Agent, or Firm*—Lowell W. Gresham; Jordan M. Meschkow; Charlene R. Jacobsen

(57) ABSTRACT

A programmable electronic device (10) stores a number of cipher-text software modules (14) to which access is granted after evaluating a user's token (55, 80, 82), a software-restriction class (58) for a requested software module (14), and/or a currently active access-control model (60). Access-control models (60) span a range from uncontrolled to highly restrictive. Models (60) become automatically activated and deactivated as users are added to and deleted from the device (10). A virtual internal user proxy that does not require users to provide tokens (80, 82) is used to enable access to modules (16) classified in a global software-restriction class (62) or when an uncontrolled-access-control model (68) is active. Both licensed modules (76) and unlicensed modules (18,78) may be loaded in the device (10). However, no keys are provided to enable decryption of unlicensed modules (18,78).

13 Claims, 10 Drawing Sheets

U.S. PATENT DOCUMENTS

| | | |
|---|---|---|
| 6,081,893 A | 6/2000 | Grawrock et al. |
| 6,084,968 A * | 7/2000 | Kennedy et al. ............ 380/259 |
| 6,134,324 A * | 10/2000 | Bohannon et al. ............ 705/52 |
| 6,141,757 A | 10/2000 | Seeker et al. ............... 713/200 |
| 6,169,976 B1 * | 1/2001 | Colosso ....................... 705/59 |
| 6,219,420 B1 | 4/2001 | Hardy et al. .................... 380/2 |
| 6,351,817 B1 | 2/2002 | Flyntz ....................... 713/202 |
| 6,513,121 B1 * | 1/2003 | Serkowski ................... 726/29 |
| 6,584,454 B1 * | 6/2003 | Hummel et al. .............. 705/59 |
| 6,615,359 B2 * | 9/2003 | Eyres et al. .................. 726/33 |
| 6,810,389 B1 * | 10/2004 | Meyer ......................... 705/59 |
| 2003/0039358 A1 | 2/2003 | Scheidt et al. |
| 2003/0070174 A1 * | 4/2003 | Solomon ..................... 725/98 |

* cited by examiner

US 7,290,144 B1

ACCESS-CONTROL METHOD FOR SOFTWARE MODULES AND PROGRAMMABLE ELECTRONIC DEVICE THEREFOR

GOVERNMENT RIGHTS

This invention was made with Government support under MDA904-99-C-6512 awarded by NSA. The Government has certain rights in this invention.

RELATED INVENTION

This invention is related to "System And Method For Managing Keys For Secure Devices," U.S. patent application Ser. No. 10/176,776, filed 21 Jun. 2002 by the inventors hereof, which is assigned to the assignee hereof, said patent application being incorporated herein by reference.

TECHNICAL FIELD OF THE INVENTION

The present invention relates generally to the field of programmable electronic devices. More specifically, the present invention relates to controlling access to a plurality of software modules loaded in said electronic devices.

BACKGROUND OF THE INVENTION

A programmable electronic device that processes data may be put to a variety of different uses by a variety of different users who have a variety of different concerns about the data processed by the device. Such a programmable electronic device may be a computerized device on which a variety of different software programs can be executed to do a variety of data processing tasks. Data may take the form of, but is not limited to, voice, audio, or video electronic signals or information. Such devices include personal computers, workstations, servers, laptops, palmtops, cellular phones, telephones, audio equipment, video equipment, and a wide variety of other devices in which different computer programs are stored and launched to perform a variety of data processing jobs. Manufacturers need to control the software usable on such devices. Users sometimes need to tightly control who has access to the processed data, or at least some of the data, and other times wish to exert little or no control.

The complicated task of controlling the software involves making sure the right device gets loaded with the right software, supporting that software, and upgrading that software. When different devices get different software packages, this software becomes difficult and expensive to manage due to the vast number of combinations of software programs and versions of software programs that may be loaded throughout a population of similar devices. Mistakes in knowing which device has or should have which software lead to tremendously increased costs through the distribution of unlicensed software, providing support to unlicensed users, misdirected problem-solving efforts, and the like.

Another aspect of controlling the software involves taking steps to minimize unauthorized uses of software. For example, manufacturers wish to insure that software licensed for use on one device cannot be easily used on a different device.

Controlling access to the device becomes more complex as more users are capable of utilizing the device. If no more than a few users use the device and no communication link or network is available to afford greater access, then users often wish to avoid the burdens of imposing user restrictions on the device. Security may be adequately maintained merely by controlling physical access to the device. However, as more users have access or potential access, then the benefits of imposing user restrictions tend to outweigh the burdens.

In one example, a stand-alone workstation may require no password before access is permitted to the workstation's computer software and data. However, a server available to a number of workstations may require passwords to control access to the server's software and data. In a conventional situation, the server will provide an access-control system that gives an administrator certain permissions that other users or user groups do not have. Such permissions may include the ability to define new users and user groups and the ability to indicate which users and user groups have access to which data and software. Unfortunately, no single access-control system adequately serves this range of needs. Either very little security is provided but greater user flexibility is realized, or more security is provided with significantly reduced user flexibility. It would be advantageous if a single access-control system implemented on a device could serve a wide range of needs.

SUMMARY OF THE INVENTION

It is an advantage of the present invention that an improved access-control method for software modules and programmable electronic device therefor are provided.

Another advantage of the present invention is that a flexible access-control system is provided which permits the device with which it is used to be operated over a range of security controls, from a permissive system that does not require tokens to a highly restrictive permission system wherein only certain user tokens are granted access to certain software modules.

Another advantage of the present invention is that an access-control system is provided in which an entire set of software modules may be delivered to a customer, even though that customer is licensed to use only a subset of the entire set of software modules.

Another advantage of the present invention is that an access-control system is provided in which a manufacturer has assurance that software modules and permissions provided for one device are not usable on another device.

Another advantage of the present invention is that an access-control system is provided in which the management of different versions of different software modules and the upgrading thereof are user-friendly for manufacturer and customers alike.

These and other advantages are realized in one form by an improved method of managing a plurality of software modules used in a programmable electronic device which selectively activates at least a portion of the plurality of software modules by controlling access to the software modules. The method encrypts each one of an entire set of original, plain-text software modules using at least one cipher-key to form cipher-text software modules. The entire set of cipher-text software modules is loaded in the device, and the device is delivered to a customer. Later versions of at least some of the original plain-text software modules are generated to form updated plain-text software modules. The updated plain-text software modules are encrypted to generate updated cipher-text software modules. The device is upgraded after delivery of the device to the customer by providing the entire set of software modules to the customer, wherein the entire set includes the updated cipher-text software modules.

These and other advantages are realized in another form by an improved programmable electronic device having an access-control system configured to selectively activate any of a plurality of software modules. The device includes a memory having a plurality of software modules which have been classified into software-restriction classes. An access-control-model-activator is configured to activate one of a plurality of access-control models. An input device is configured to receive a request to access one of the plurality of software modules. An access-control-processor is configured to evaluate the software-restriction class for the one of the plurality of software modules and to evaluate the one of the plurality of access-control models to determine whether to grant access to the one of the plurality of software modules. A module-activator is configured to activate the one of the plurality of software modules when the access-control processor determines to grant access to the one of the plurality of software modules.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
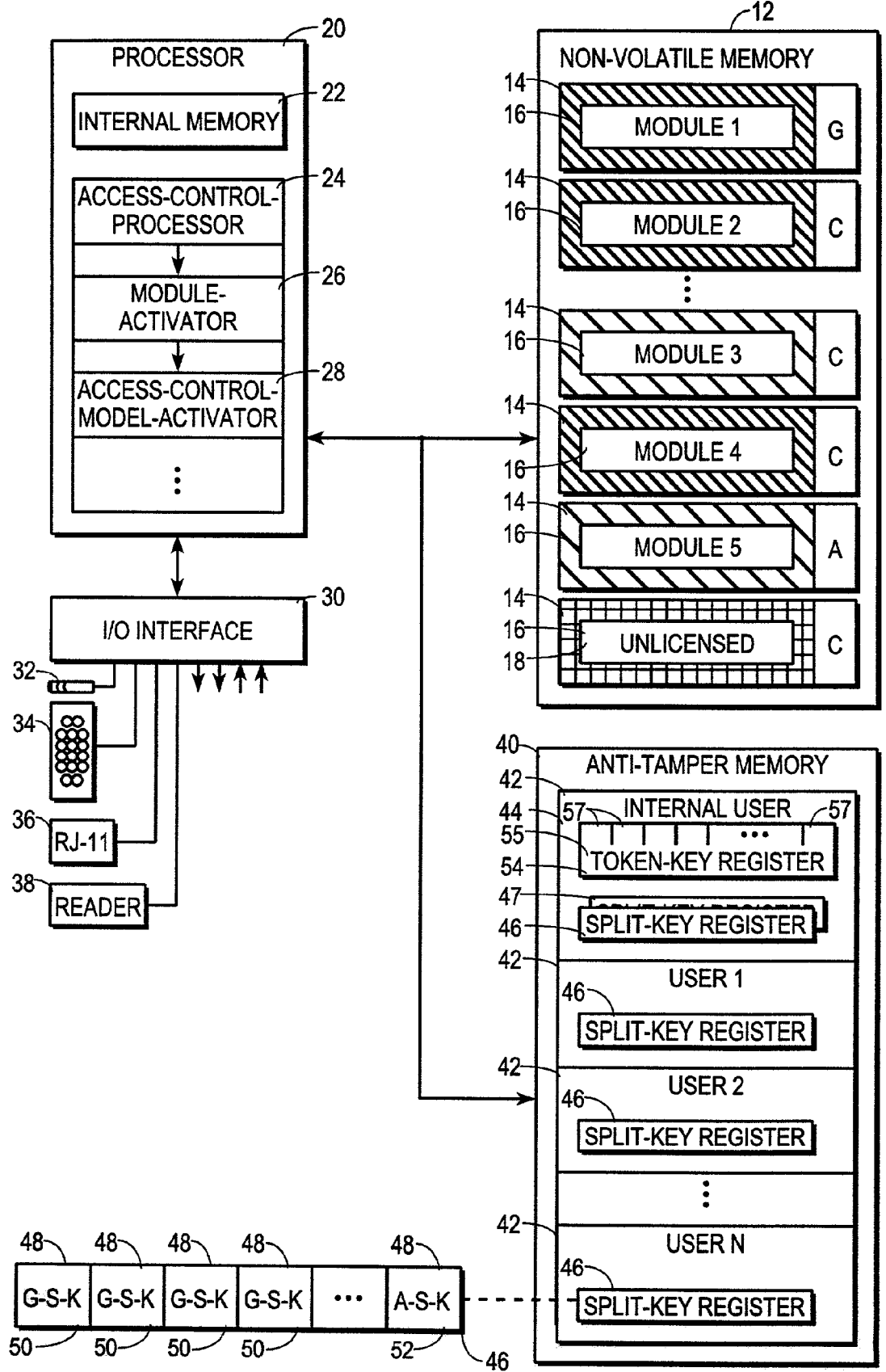
FIG. 1 shows a block diagram of an example of a programmable device configured in accordance with the teaching of the present invention.

FIG. 1 shows a block diagram of an example of a programmable electronic device 10 configured in accordance with the teaching of the present invention. Device 10 is an electronic device intended to process a wide variety of data, both public and private, using a wide variety of software programs. The data processed may take the form of, but is not limited to, voice, audio, or video electronic signals, or any other information or data that is conventionally processed by computers and computer-controlled equipment. Examples of device 10 may take the form of personal computers, workstations, servers, laptops, palmtops, cellular phones, telephones, radios, audio equipment, video equipment, and a wide variety of other equipment in which different computer programs are stored and launched to perform a variety of data processing jobs.

Device 10 includes a non-volatile memory 12 in which cipher-text software modules 14 are stored. Cipher-text modules 14 appear to be random data, but may be decrypted to reveal plain-text software modules 16, provided the appropriate decryption algorithms and the appropriate decryption keys are used to do the decrypting. Desirably, each cipher-text software module 14 is isolated from all other modules 14 through the use of a key associated with that module 14. Any number of cipher-text software modules 14 may be stored in memory 12. While FIG. 1 depicts only cipher-text software modules 14 stored in memory 12, nothing prevents memory 12 from additionally storing plain-text modules 16. FIG. 1 depicts different blocks 14 using different cross-hatching techniques to indicate that different blocks 14 may have been encrypted using different encryption algorithms and/or keys, hereinafter called cipher-keys, and therefore require correspondingly different decryption algorithms and/or cipher-keys to achieve a successful decryption. However, nothing requires device 10 to use different encryption algorithms and/or cipher-keys in forming cipher-text software modules 14 from plain-text software modules 16.

Those skilled in the art will appreciate that the number of encryption/decryption algorithms and or keys, the precise mathematical and logical manipulations performed by such algorithms, and the precise nature of the functions performed by the various plain-text software modules 16 are not critical features in the present invention. Moreover, plain-text software modules 16 may be executable computer programs, data processed, manipulated, or simply moved or copied by computer programs, or a combination of both computer programs and data.

Plain-text software modules 16, and correspondingly the associated cipher-text software modules 14, have been classified in accordance with a hierarchical software-restriction classification system, which is discussed in more detail below. Briefly, an "administration" classification (A) indicates that an externally-supplied administrator token may be required to access the plain-text software modules 16. As will be discussed in more detail below, a determination of whether or not the externally-supplied administrator token will be required also depends upon which one of a plurality of different access-control models has been activated.

A token is an item of information that desirably serves to authenticate a user of device 10. A token may take the form of a personal identification number ("pin"), a password, data obtained from a data-conveying medium, biometric data scanned directly from users' bodies, or the like. Examples of data-conveying media include a magnetic stripe card, smart card, bar code printed on a card, and the like. Examples of biometric data include fingerprints, irises, facial features, DNA, and the like. A token may include any number of token-keys, wherein each token-key represents a subset of the token data. Thus, a plurality of token-keys may be associated together in a single token. In the above-discussed related invention, a pin expander process is described wherein a simple pin is expanded to a token having a plurality of cryptographically independent token-keys, with the entropy of the pin applying to each of the token-keys.

In the exemplary preferred software-restriction classification system described herein, the administration class is the most restrictive. Typical software modules classified in the administration software-restriction class (A) would perform security-sensitive utility functions related to loading and upgrading modules on device 10, adding and deleting users, assigning permissions for different users to access different modules, and the like. A "constrained" (C) class is less restrictive than the administration class, and a "global" (G) class is even less restrictive than the constrained class. Application software (i.e., software most directly involved in performing the functions for which device 10 is provided) would typically by classified in the constrained software-restriction class (C). For software modules 16 classified as being in the global software-restriction class (G), no externally-supplied token is required to gain access. Security-insensitive utility functions may desirably be classified in the global software-restriction class (G).

FIG. 1 depicts memory 12 as storing encrypted versions of plain-text software modules 1-5, although any number of such modules may be present. Software modules 1-5 are all licensed. So long as a user presents the token required of the software-restriction class into which a requested software module 16 has been classified, if any, then the user may be granted access to the requested software module 16.

In contrast to licensed modules 1-5, FIG. 1 also depicts an encrypted form of an unlicensed plain-text software module 18. No user of device 10 can be granted access to unlicensed module 18 regardless of the software-restriction class into which unlicensed module 18 has been classified because the keys needed to decrypt unlicensed module 18 are not present in device 10 to generate the cipher-key that could decrypt unlicensed module 18. Any number of unlicensed modules 18 may be present in memory 12. In one scenario, unlicensed modules 18 may be applications that are originally installed by the manufacturer of device 10, but not paid for or desired by the customer. As discussed below, a licensing process may take place to change unlicensed modules 18 into licensed modules. Those skilled in the art will appreciate that the terms "licensed" and "unlicensed" are used herein to indicate mutually exclusive status conditions and need not mandate any particular legal, rental, lease, ownership, or other arrangement or contract.

Plain-text software modules 16, when successfully decrypted, are loaded in and/or executed by a processor 20 which couples to non-volatile memory 12. Processor 20 is desirably configured as a single-chip microprocessor that includes at least a central processing unit (CPU) and an internal memory 22 located in a single integrated circuit device. Internal memory 22 may be configured as read only memory and/or as read-write memory.

In internal memory 22, or in the alternative other memory coupled to processor 20, any number of plain-text computer programs may be stored which, when executed in processor 20, cause processor 20 to perform a variety of different processing functions. These computer programs include an access-control-processor 24, a module-activator 26, and an access-control-model-activator 28, to name but a few, which are discussed below in more detail. Desirably, processor 20 is configured so that no computer program may be loaded in device 10 or executed in device 10 unless an associated cryptographic authentication mechanism can be verified, a process well known to those skilled in the art.

An input/output (I/O) interface 30 couples processor 20 to a variety of I/O devices, which may include a microphone 32, keypad 34, a phone jack 36, and a card reader 38. No one type of I/O device is essential for inclusion in device 10, and numerous other well-known input and output devices may also be included. Such other I/O devices may include a speaker, network interface card (NIC), modem, radio frequency (RF) transceiver, display, printer, removable memory interface, keyboard, pointing device, optical scanner, magnetic card reader, bar code scanner, smart card reader, memory-stick reader, scanner of biometric features, or the like.

Processor 20 also couples to an anti-tamper memory 40. Anti-tamper memory 40 is a volatile memory device or set of devices desirably energized through the use of conductors and connections that are easily broken should the housing (not shown) which contains anti-tamper memory 40 be tampered with. However, anti-tamper memory 40 is desirably continuously energized, such as by battery backup if necessary, so that it functions as a non-volatile memory that retains its contents when device 10 is powered down in a normal manner. In one embodiment, internal memory 22 serves as anti-tamper memory 40. Accordingly, the act of tampering with the aim of discovering data stored in anti-tamper memory 40 is highly likely to cause power to be removed and the contents of anti-tamper memory 40 to be destroyed.

Among other things, anti-tamper memory 40 is configured to store any number of user tables 42, with one table 42 being provided for each user that has been installed on device 10. One user table 42, hereinafter referred to as internal user table 44, differs from the other user tables 42 because it is not associated with any particular "external" user of device 10. Internal user table 44 is provided for a virtual "internal" user. The internal user represents any user that may wish to use device 10, without consideration of the user's identity or authorization to use device 10.

Each table 42 includes a split-key register 46 associated with any number of user ID registers (not shown). Each split-key register 46 holds split-keys 48 that have been created for the subject user. One split-key 48 is desirably created for each cipher-text software module 14 in a one-to-one correspondence. As discussed below, split-keys 48 are desirably created even for unlicensed cipher-text software modules 18.

The split-keys 48 stored in a split-key register 46 are cryptographically independent of one another. In other words, any correlation between split-keys 48 is desirably less than or equal to the correlation found in the cipher-text software module 14 of cipher data encrypted with the strongest encryption algorithm supported by device 10. The precise length of any particular one of the various split-keys 48 is not a critical feature of the present invention, but cryptographic goals are generally better achieved using longer bit-lengths for split-keys 48.

FIG. 1 illustrates an example data format for split-keys 48 stored in a split-key register 46. This format indicates one split-key 48 for each cipher-text software module 14 in non-volatile memory 12 in a one-to-one correspondence. For purposes of illustration, split-keys 48 associated with licensed plain-text software modules 1-5 are genuine split-keys (G-S-K) 50, and the split-key 48 associated with unlicensed module 18 is depicted as being an artificial split-key (A-S-K) 52. A genuine split-key 50 is a split-key 48 that, when combined in a predetermined fashion with a token of a user installed on device 10, generates the appropriate cipher-key that permits successful decryption of the associated cipher-text software module 14. An artificial split-key 52 is a split-key 48 that, when combined in the same predetermined fashion with a token of a user installed on device 10, fails to generate the cipher-key that permits successful decryption of the associated module 14. Any split-key 48 may be either a genuine split-key 50 or an artificial split-key 52. In order to best achieve cryptographic goals, even artificial split-keys 52 maintain cryptographic independence from one another and from genuine split-keys 50. Thus, artificial split-keys 52 are desirably generated based, at least in part, on random numbers.

Internal user table 44 includes an internal token-key register 54 in which is stored an internally-supplied token 55 having any number of token-keys 57. Internal user table 44 also includes a split-key register 46. Internal token-keys 57 from token 55 are associated with split-keys 48 in split-key registers 46 in a one-to-one correspondence. Token 55 is internally-supplied because it is supplied from within device 10 for use by the virtual internal user. In contrast, externally-supplied tokens, discussed below, are supplied from outside device 10 through an input device, such as keypad 34 or reader 38. Desirably, externally-supplied tokens have substantially the same format as internal token 55 and also include any number of token-keys 57. Internal user table 44 also includes a split-key register 47 which contains artificial split-keys 52 that are not associated with any token-key 57 currently usable with device 10. But the artificial split-keys 52 in register 47 may be used later in activating unlicensed modules 18.

Figure 2:
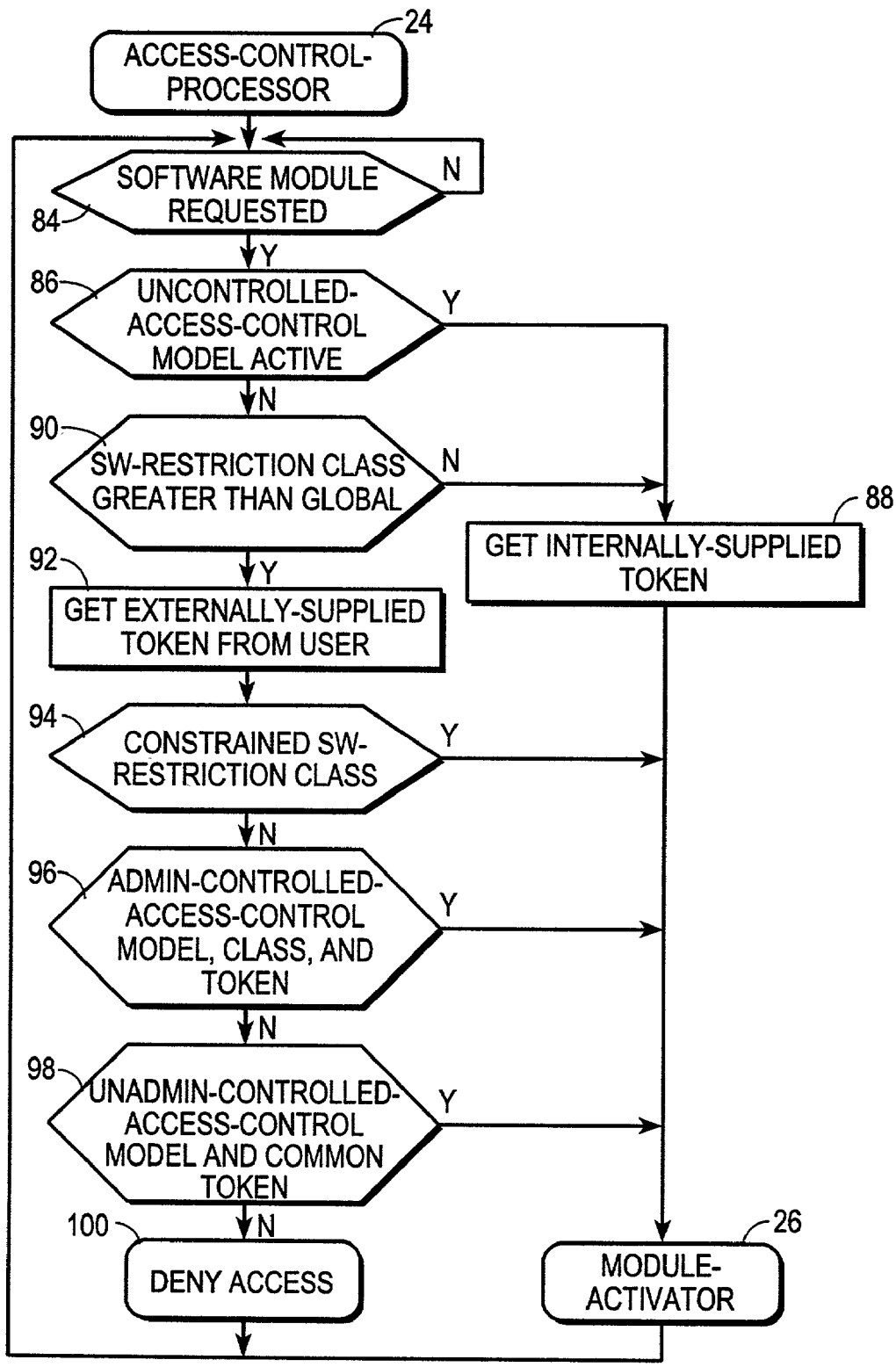
FIG. 2 shows a flow chart depicting an exemplary form of operation for an access-control processor segment of a processor included in the device of FIG. 1.
Figure 3:
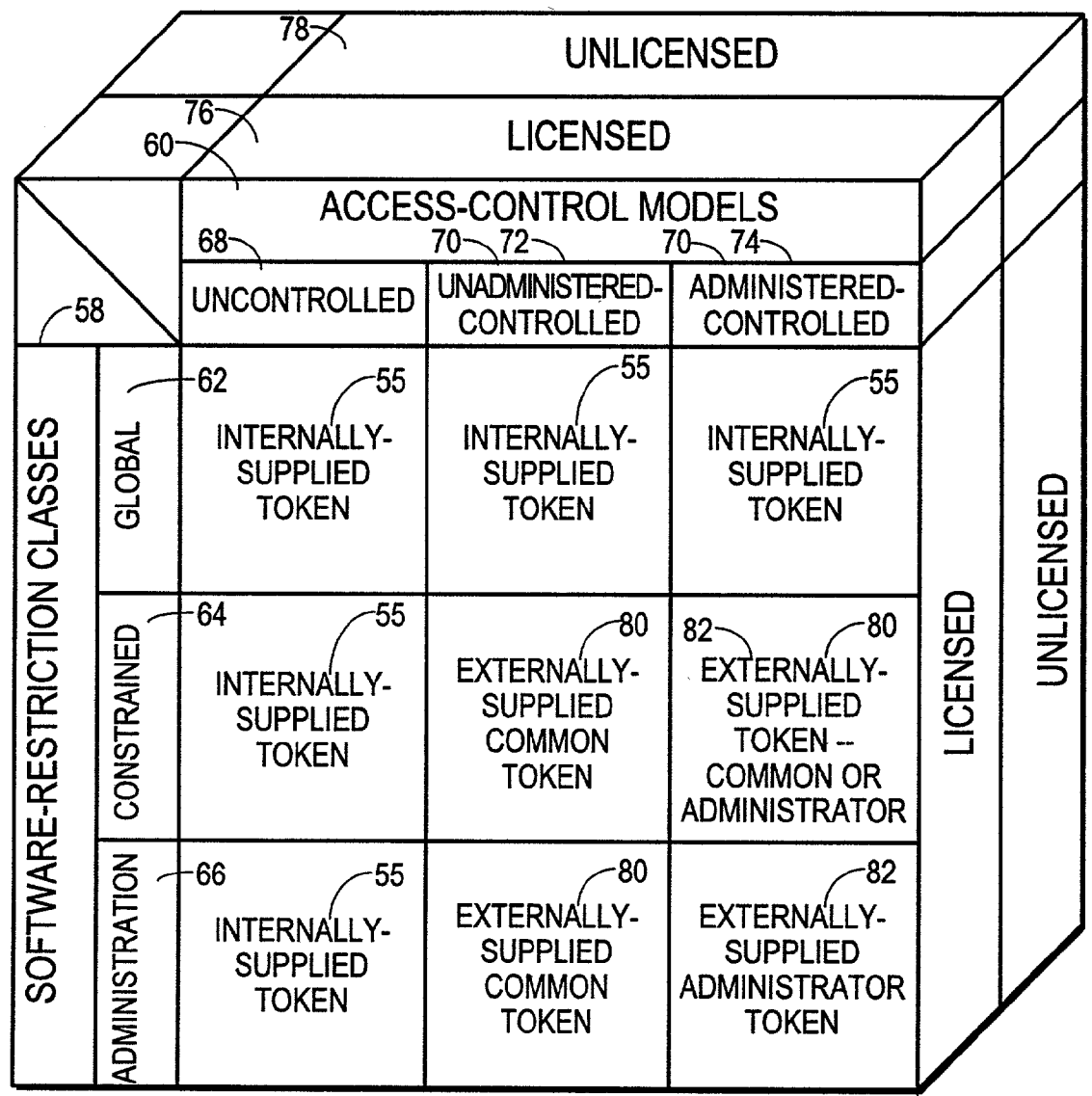
FIG. 3 shows a table depicting an exemplary access-control system implemented by the device of FIG. 1.

FIG. 2 shows a flow chart depicting an exemplary form of operation for access-control-processor 24. FIG. 3 shows a table 56 depicting an exemplary access-control system implemented by device 10. Processor 24 operates a continuous programming loop in the embodiment depicted in FIG. 2. In this continuous programming loop, processor 24 reacts to a request received from a user of device 10, through keypad 34 (FIG. 1) or another input device, to activate an identified one of plain-text software modules 16 (FIG. 1). Referring to FIG. 3, processor 24 evaluates a software-restriction class 58 into which the requested software module 16 has been classified and the active access-control model 60 to determine whether or not to activate the requested software module 16.

Table 56 indicates that this exemplary preferred access-control system contemplates the global software-restriction class 62, labeled with a "G" in FIG. 1, the constrained software-restriction class 64, labeled with a "C" in FIG. 1, and the administration software-restriction class 66, labeled with an "A" in FIG. 1.

Table 56 also indicates that this exemplary preferred access-control system contemplates the implementation of three different access-control models. At any given instant, either an uncontrolled-access-control model 68 or a controlled-access-control model 70 may be active. Two controlled-access-control models 70 are depicted. One is an unadministered-controlled-access-control model 72, and the other is an administered-controlled-access-control model 74. Uncontrolled-access-control model 68 is the least restrictive access-control model 60, while administered-controlled-access-control model 74 is the most restrictive access-control model 60. Those skilled in the art will appreciate the precise number or nature of software-restriction classes 58 and/or access-control models 60 may vary from application to application.

Table 56 further indicates that licensing may be of the "licensed" status 76 or the "unlicensed" status 78. Accordingly, for the exemplary preferred access-control system shown in FIG. 3, eighteen different access scenarios are presented, with each scenario characterized by a software-restriction class into which the requested software module 16 has been classified, an access-control model 60 that has been activated for device 10, and a licensing status for the requested software module 16. Of the eighteen scenarios, nine are associated with unlicensed modules 18 (FIG. 1). In each of these nine unlicensed scenarios, no access is granted to the requested software module 16.

Three of the remaining nine scenarios occur when uncontrolled-access-control model 68 is active and a requested module 16 is licensed. When uncontrolled-access-control model 68 is active, no externally-supplied token is required to grant access to a requested, licensed plain-text software module 16, regardless of which software-restriction class 58 into which the requested software module may have been classified. Thus, table 56 indicates that internally-supplied token 55 is used to grant access. Likewise, whenever the requested software module 16 has been classified in the global software-restriction class 62, no externally-supplied token is required to grant access, regardless of which access-control model 60 may be active for device 10. Again, table 56 indicates that internally-supplied token 55 is used to grant access.

However, externally-supplied tokens 80 or 82 are required in order to grant access to a requested plain-text software module 16 in several scenarios. When unadministered-controlled-access-control model 72 is active and the requested software module 16 has been classified as being either in the constrained software-restriction class 64 or the administration software-restriction class 66, then an externally-supplied common token 80 is required before access is granted to the requested software module 16. When administered-controlled-access-control model 74 is active and the requested software module 16 has been classified as being in constrained software-restriction class 64, then an externally-supplied token is required before access is granted to the requested software module 16. The externally-supplied token may be either a common token 80 or an administrator token 82. However, when administered-controlled-access-control model 74 is active and the requested software module 16 has been classified as being in administration software-restriction class 66, then the externally-supplied administrator token 82 is required before access is granted to the requested software module 16.

Referring to FIGS. 2-3, processor 24 includes a query task 84 that determines whether a request for a plain-text software module 16 has been received. Program control remains at task 84 until such a request is detected. Upon the receipt of a request to access one of software modules 16, a query task 86 determines whether uncontrolled-access-control model 68 is currently active for device 10. Task 86 may make its determination by examining a memory location in anti-tamper memory 40 (FIG. 1) used to identify the currently active access-control model 60. If uncontrolled-access-control model 68 is found to be active at task 86, a task 88 is performed to get an appropriate token-key 57 (FIG. 1) from internally-supplied token 55 (FIGS. 1-2), and program control proceeds to module-activator 26. By using internally-supplied token 55, access will be automatically granted to the requested software module 16 if it is licensed. No externally-provided token is required.

If task 86 determines that a controlled-access-control model 70 is active, then a query task 90 determines whether the software-restriction (SW-restriction) class 58 of the requested software module 16 is greater (i.e., more restrictive) than global software-restriction class 62. If the software-restriction (SW-restriction) class 58 of the requested software module 16 is not greater than global software-restriction class 62 (i.e., equals global software-restriction class 62) then task 88 is performed to get an appropriate token-key 57 from internally-supplied token 55 (FIGS. 1-2), and program control proceeds to module-activator 26. Access will be automatically granted without requiring an externally-provided token so long as the requested software module 16 is licensed.

If task 90 determines that the software-restriction class 58 of the requested software module 16 is greater than global (i.e., is constrained or administration software-restriction classes 64 or 66), then a task 92 gets an externally-supplied token 80 or 82 from the user. If no such token is eventually provided, then an appropriate error handler (not shown) may effectively deny access to the requested software module 16 and return program control to task 84. In addition, task 92 may also obtain a user ID from the user, and the user ID may desirably be associated with a flag indicating whether or not the user is an administrator.

Next, a query task 94 determines whether the current scenario is one where the requested software module 16 has been classified into constrained software-restriction class 66. If such a scenario is detected, then program control passes to module-activator 26 where access will be granted using externally-supplied common token 80 or administrator token 82 so long as the requested software module 16 is licensed.

When task 94 fails to detect such a scenario, a query task 96 determines whether the current scenario is one where the requested software module 16 has been classified into administration software-restriction class 66, administered-controlled-access-control model 74 is currently active, and the administrator token 82 was provided above in task 92. If such a scenario is detected, then program control again passes to module-activator 26 where access will be granted using externally-supplied administrator token 82 so long as the requested software module 16 is licensed.

When task 96 fails to detect such a scenario, a query task 98 determines whether the current scenario is one where unadministered-controlled-access-control model 72 is currently active, and a common token 80 has been provided above in task 92. If such a scenario is detected, then program control again passes to module-activator 26 where access will be granted using externally-supplied common token 80 so long as the requested software module 16 is licensed.

When task 98 fails to detect such a scenario, an appropriate deny access process 100 is performed. Process 100 may inform the user that access is being denied, but process 100 will prevent the requested plain-text software module 16 from becoming decrypted, much less activated thereafter. After deny access process 100, program control loops back to task 84 to await another request for access to a software module 16. Likewise, when module-activator 26 is complete, program control loops back to task 84 to await another request for access to a software module 16.

Figure 4:
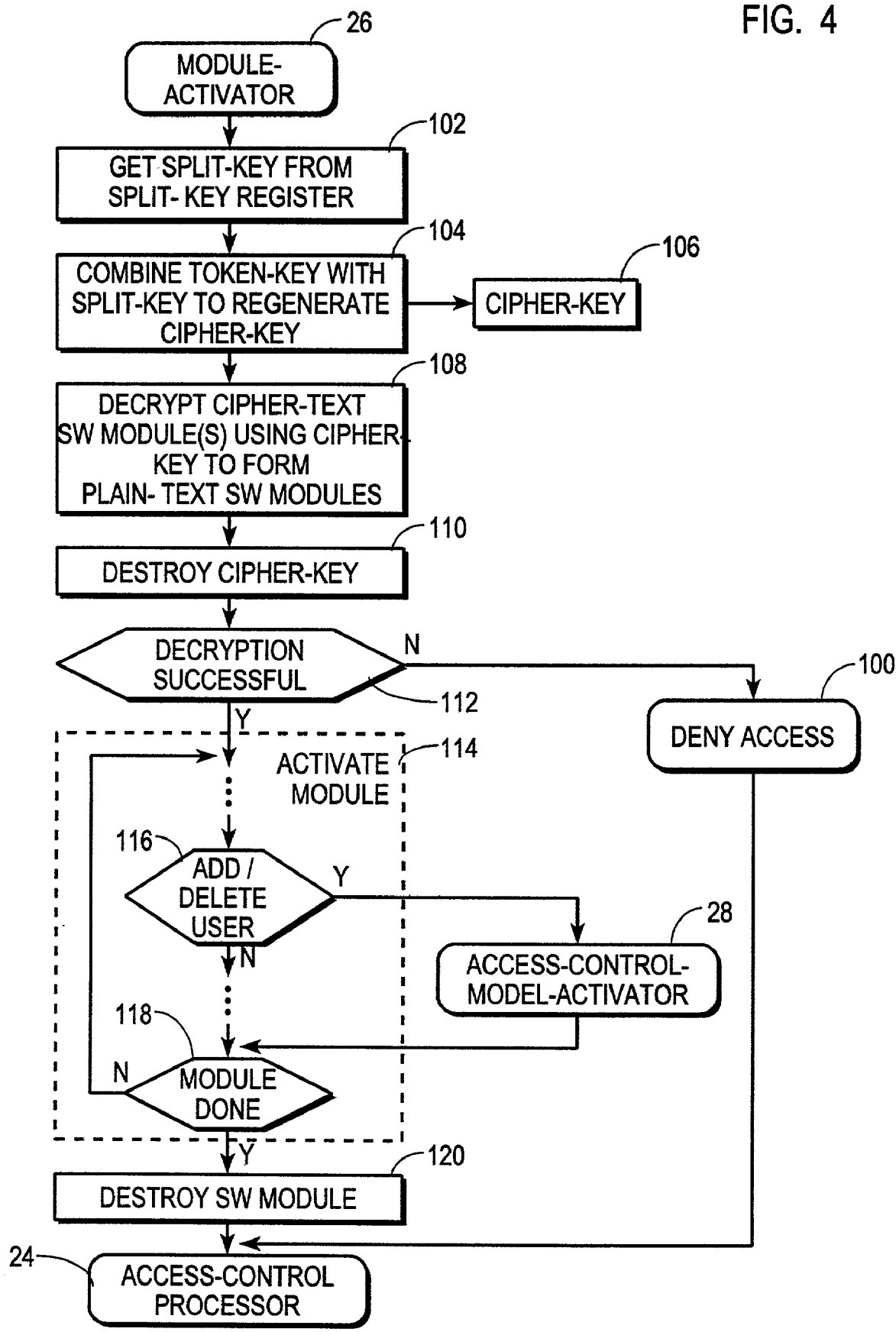
FIG. 4 shows a flow chart depicting an exemplary form of operation for a module-activator segment of the processor included in the device of FIG. 1.

FIG. 4 shows a flow chart depicting an exemplary form of operation for module-activator 26. Module-activator 26 is invoked from access-control-processor 24 (FIG. 1) as discussed above. Module-activator 26 includes a task 102 in which an appropriate split-key 48 (FIG. 1) for the requested module 14 is obtained from split-key register 46 (FIG. 1). If internally-supplied token 55 is being used, then split-key 48 is obtained from internal user table 44 (FIG. 1). Otherwise, if an externally-supplied token 80 or 82 is being used, then split-key 48 is obtained from the user table 42 of the user that provided the token. The split-key 48 obtained in task 102 may be either a genuine split-key 50 (FIG. 1) or an artificial split-key 52 (FIG. 1).

After task 102, a task 104 combines an appropriate token-key 57 from the token 55, 80, or 82 obtained above in tasks 88 or 92 (FIG. 2), with split-key 48 to regenerate a cipher-key 106. Task 104 desirably stores the just-generated cipher-key 106 in internal memory 22 (FIG. 1). Task 104 implements a predetermined combination function with the following property: when a token-key 57 is combined with a split-key 48, a cipher-key 106 results; when this cipher-key 106 is combined with the same token-key 57, the same split-key 48 appears; and, when the cipher-key 106 is combined with the same split-key 48, the same token-key 57 appears. A bitwise exclusive-or and a bitwise exclusive-nor operation represent two combination functions that provide this property, but other combinations functions may be devised as well. Desirably, split-key 48, token-key 57, and cipher-key 106 all have the same bit length. The same combination function is used at the various tasks within device 10 where token-keys 57 and split keys 48 are combined, where split-keys 48 and cipher-keys 106 are combined, where token-keys 57 and cipher-keys 106 are combined, and the like.

Next, a task 108 uses cipher-key 106 to decrypt a cipher-text software module 14 to form the requested plain-text software module 16, which is desirably then stored in internal memory 22 (FIG. 1). Following task 108, a task 110 destroys cipher-key 106 to promote the security of software modules 16 by completely removing cipher-key 106 from device 10. Those skilled in the art will appreciate that cipher-key 106 or other data may be destroyed by overwriting the physical memory location where that data was stored with other data having no particular relationship with the just-destroyed data.

Nothing mandates the decryption to have been carried out successfully above in task 108. In fact, if an improper token-key 57 or an artificial split-key 52 (FIG. 1) was used in generating cipher-key 106, then the decryption was not carried out successfully. One situation where an unsuccessful decryption will take place is when an attempt is made to decrypt unlicensed modules 18 (FIG. 1) because artificial split-keys 52 are stored therefor in user tables 42 (FIG. 1). Only if the proper token-key 57 and a genuine split-key 50 were combined in task 104 to generate cipher-key 106 will the decryption have been carried out successfully. Following task 110, a query task 112 determines whether the decryption was successful. A variety of diverse activities may take place at task 112 to evaluate whether a decryption was successful. In one embodiment, task 112 may look for specific test data embedded in module 16. In another embodiment, task 112 may verify a digital certificate or checksum for module 16. If an unsuccessful decryption is detected, deny access process 100 is performed, and program control passes back to access-control-processor 24. Access will be denied to the requested software module 16. When task 112 determines that the decryption was successful, an activate module process 114 is performed. Activate module process 114 launches, executes, invokes, opens, or otherwise makes the requested plain-text software module 16 available to the user on device 10. The precise nature of the processing performed and of the data upon which processing takes place are not relevant in the present invention.

For the purposes of illustrating the preferred embodiment of the present invention, FIG. 4 illustrates activate module process 114 as including a query task 116. Query task 116 would typically be implemented only by a software module 16 which, when activated, permitted a user to add or delete users of device 10. In a typical application, such a software module 16 would be classified into the administration software-restriction class 66 (FIG. 3). If uncontrolled-access-control model 68 (FIG. 3) were active, then any user with physical access to device 10 could automatically activate such a module without supplying an externally-supplied token 80 or 82. If unadministered-controlled-access-control model 72 (FIG. 3) were active, then a user would be required to produce a suitable common token 80 that, when combined with a genuine split-key 50 for that user and for that software module 16, would produce the proper cipher-key 106 in order to activate such a module. If administered-controlled-access-control model 74 (FIG. 3) were active, then a user would be required to produce a proper administrator token 82 that, when combined with a genuine split-key 50 for that user and for that software module 16, would produce the proper cipher-key 106 in order to activate such a module. When query task 116 determines that a request is being made to add or delete a user, access-control-model-activator 28 is performed. Access-control-model-activator 28 is discussed in more detail below in connection with FIG. 5.

In addition, activate module process 114 also includes a query task 118 which determines when the user is finished with the requested plain-text software module 16. So long as the user is not yet finished, program control remains in activate module process 114. However, when the user is finished, program control exits activate module process 114 and proceeds to a task 120, which then destroys the plain-text software module 16 resident in internal memory 22 (FIG. 1). At this point, neither plain-text software module 16 nor the cipher-key 106 needed to decrypt it is available within device 10, and program control passes back to access-control processor 24.

Figure 5:
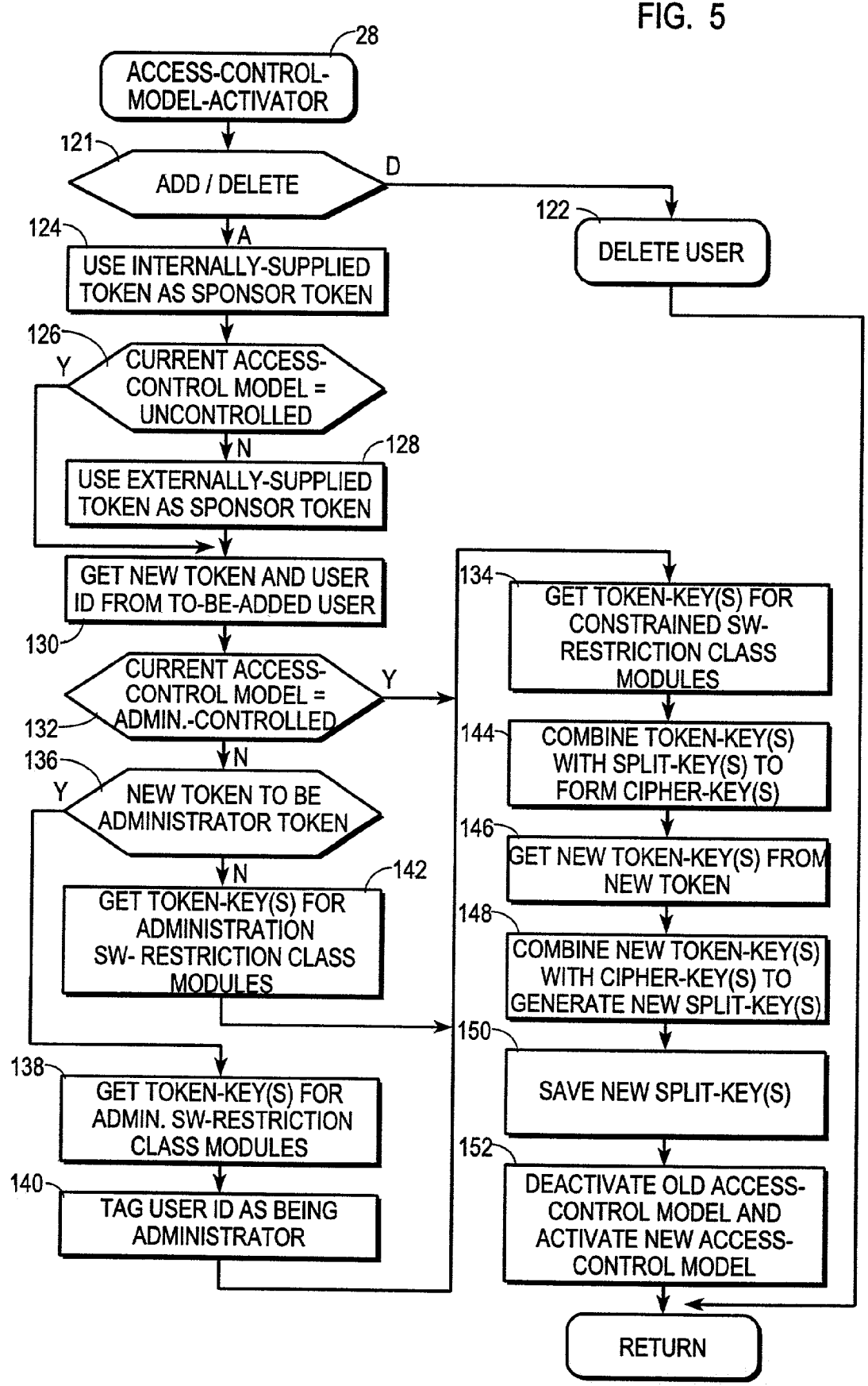
FIG. 5 shows a flow chart depicting an exemplary form of operation for an access-control-model-activator segment of the processor included in the device of FIG. 1.

FIG. 5 shows a flow chart depicting an exemplary form of operation for access-control-model-activator 28. Access-control-model-activator 28 determines which one of access-control models 60 (FIG. 3) is currently active for device 10. Access-control-model-activator 28 is automatically driven in the preferred embodiment by the addition and deletion of users, and may be automatically invoked when activate module process 114 (FIG. 4) is also active in connection with a software module 16 that provides the function of adding and deleting users, as discussed above in connection with FIG. 4.

Access-control-model-activator 28 includes a query task 121 which determines whether a user is being added or deleted. If a user is being deleted, then a delete user process 122 is performed. Delete user process 122 is discussed below in connection with FIG. 6. When delete user process 122 is complete, program control returns to a calling routine, such as access-control-processor 24 (FIG. 4).

When task 121 determines that a user is to be added, a task 124 initially specifies that internally-supplied token 55 should be used as a sponsor token. This initial specification may be overwritten later with an externally-supplied token 80 or 82, and subsequent tasks will use the sponsor token, regardless of whether it is an internally-supplied or externally-supplied token.

As depicted in FIG. 3, if device 10 is being operated with uncontrolled-access-control model 68 (FIG. 3), there is no need to add a user. Anyone who has access to device 10 will be granted access to any licensed software module 16 through the use of internally-supplied token 55. The virtual "internal" user serves as a proxy for all users. Accordingly, the act of adding a user serves as a signal to device 10 to deactivate uncontrolled-access-control model 68, if it is active, and activate some other access-control model 60 (FIG. 3).

After task 124, a query task 126 determines whether the current active access-control model 60 (FIG. 3) is the uncontrolled-access-control model 68 (FIG. 3). If task 126 determines the current active access-control model 60 is not uncontrolled-access-controlled model 68, but is a controlled-access-control model 70 (FIG. 3), then a task 128 overwrites the sponsor token with the externally-supplied token 80 or 82 obtained above in task 92 of access-control processor 24 (FIG. 2). When task 126 determines that uncontrolled-access-control-model 68 is currently active or upon the completion of task 128, a task 130 gets a new token from the user being added to device 10. This new token will be an externally-supplied token since it is coming from outside device 10.

Next, a query task 132 determines whether administered-controlled-access-control model 74 (FIG. 3) is currently active. If administered-controlled-access-control model 74 is currently active, the adding of a new user signals that model 74 should remain active, and program control proceeds to a task 134. Task 134 gets token-keys 57 for all software modules 16 classified in constrained software-restriction class 64 (FIG. 3). Token-keys 57 for software modules 16 are desirably obtained regardless of whether the software modules 16 have a licensed status 76 or an unlicensed status 78 (FIG. 3). In the preferred embodiment, only one administrator is permitted for device 10. Since device 10 is currently operating with administered-controlled-access-control model 74 activated, an administrator has already been assigned and another one will not be permitted. Hence, task 134 may omit token-keys 57 for software-modules 16 classified in administration software-restriction class 66 (FIG. 3) because this new user will not be permitted to access such software modules 16. The token-keys 57 are supplied in response to the token obtained above in task 130, and this token will become a common token 80 (FIG. 3). When the user has been added, the new access-control model 60 will again be administered-controlled-access-control model 74 (FIG. 3), and the new user will be granted access only to software modules 16 classified in constrained software-restriction class 64.

When query task 132 determines that administered-controlled-access-control model 74 is not currently active (i.e., either uncontrolled- or unadministered-controlled-access-control models 68 or 72 are active) the adding of a new user may signal a desire to activate a more restrictive model 60. In this situation, a query task 136 determines, perhaps through user-supplied responses to user-presented prompts, whether the new user and token are to be associated with the administrator role. If task 136 determines that an administrator role is to be assumed by the new user and token, then a task 138 gets token-keys 57 from the new token obtained above in task 130 for all software modules 16 classified in administration software-restriction class 66 (FIG. 3). Token-keys 57 for software modules 16 are desirably obtained regardless of whether the software modules 16 have a licensed status 76 or an unlicensed status 78 (FIG. 3). Following task 138, a task 140 tags the new user's ID as being in the administrator role. Program control then proceeds to task 134, where token-keys 57 are obtained for software modules 16 classified in constrained software-restriction class 64 (FIG. 3). The token supplied above in task 130 will become an administrator token 82 (FIG. 3), when the user has been added the new access-control model 60 will be administered-controlled-access-control model 74 (FIG. 3), and the new user will be granted access to software modules 16 classified in administration software-restriction class 66 and constrained software-restriction class 64.

When task 136 determines that an administrator role is not to be assumed by the new user and token, the new access-control model 60 will end up being unadministered-controlled-access-control model 72 (FIG. 3). Accordingly, a task 142 gets token-keys 57 for all software modules 16 classified in administration software-restriction classes 66 (FIG. 3). Token-keys 57 for software modules 16 are desirably obtained regardless of whether the software modules 16 have a licensed status 76 or an unlicensed status 78 (FIG. 3). After task 142, program control flows to task 134 to get token-keys 57 for all software modules 16 classified in constrained software-restriction class 64 (FIG. 3). The token obtained above in task 130 will become a common token 80, and the new user will be granted access to all software modules 16 classified in constrained and administration software-restriction classes 64 and 66.

Upon the completion of task 134, a task 144 is performed. Task 144 combines the sponsor's token-keys obtained above in task 124 but possibly overwritten in task 128 with their corresponding split-keys 48 (FIG. 1) to form cipher-keys 106 (FIG. 4). The corresponding split-keys 48 may be either genuine split-keys 50 or artificial split-keys 52. Consequently, the resulting cipher-keys 106 may or may not be usable to successfully decrypt the subject software modules 16. For example, artificial split-keys 52 will be obtained for any unlicensed modules 18 (FIG. 1), and the resulting cipher-keys 106 would produce an unsuccessful decryption. Next, a task 146 gets the new token-keys obtained above in tasks 134, 138, or 142 for the new user.

Following task 146, a task 148 combines these new token-keys 57 with those cipher-keys 106 generated above in task 144 that correspond to the new token-keys 57. The combination operation performed in task 148 generates new split-keys 48 for the new token-keys 57. To the extent that genuine split-keys 50 were used above in task 144, the resulting split-keys 48 generated in task 148 will also be genuine split-keys 50. However, for those software modules 16 for which artificial split-keys 52 were used above in task 144, artificial split-keys 52 will be generated in task 148.

After task 148, a task 150 saves the new split-keys 48 in a split-key register 46 (FIG. 1) of a user table 42 for the new user. The new split-keys 48 are stored in association with the software modules 16 for which they are provided. After task 150, a task 152 deactivates the old access-control model 60 that was active upon entry to access-control-model-activator 28 and activates the new access-control model 60. As discussed above, the new access-control model 60 will be one of the controlled access-control models 70. In certain scenarios both the old and new controlled access-control models 60 may be the same controlled access-control model 70. Task 152 may be performed by recording an appropriate entry at an appropriate location in the memory space of processor 20 (FIG. 1). After task 152, program flow exits access-control-model-activator 28 and returns to a calling routine, such as access-control-processor 24 (FIG. 4).

Figure 6:
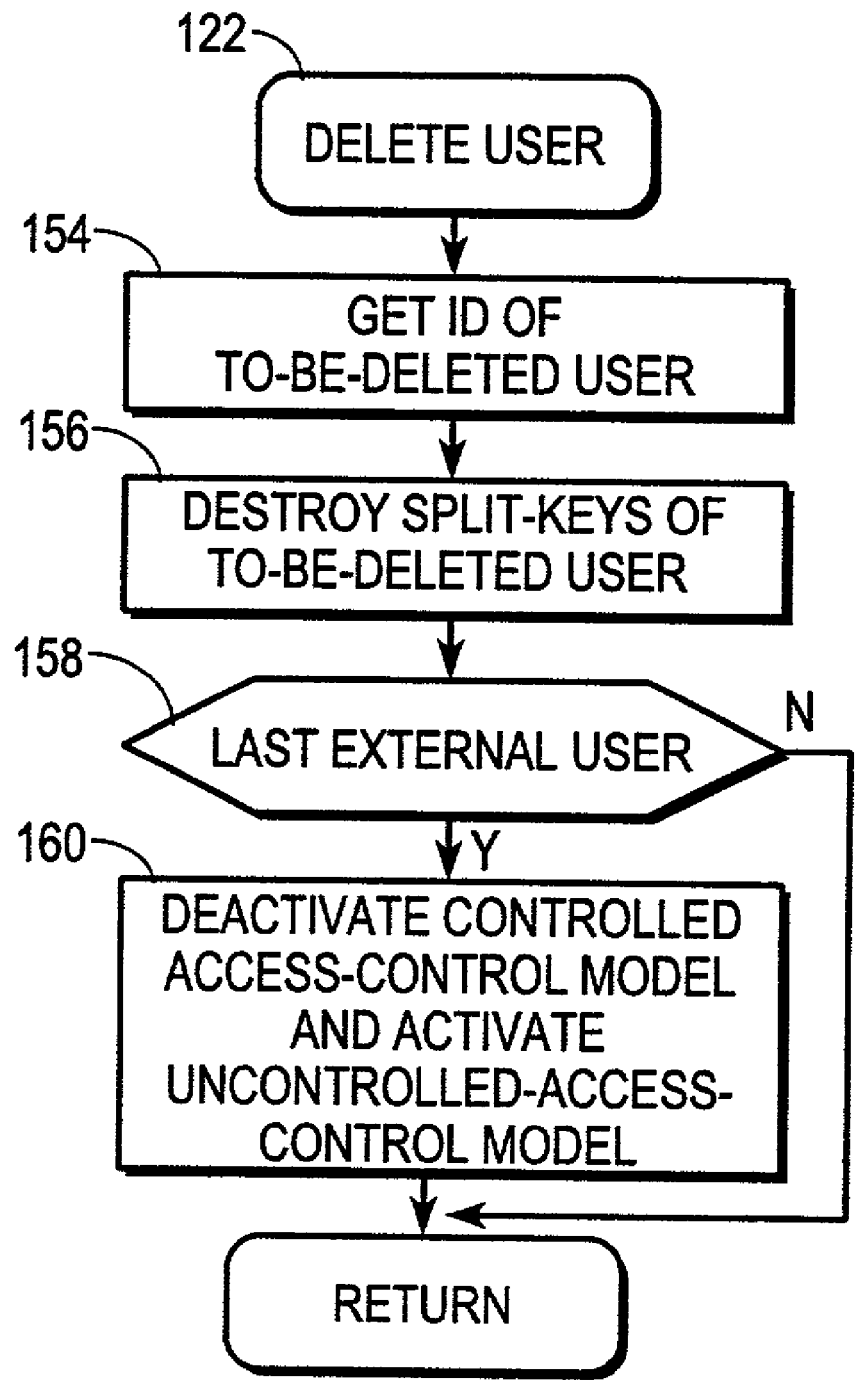
FIG. 6 shows a flow chart depicting an exemplary form of operation for a delete user process which may be performed by the access-control-model-activator segment of FIG. 5.

FIG. 6 shows a flow chart depicting an exemplary form of operation for delete user process 122. Delete user process 122 may be invoked as a part of access-control-model-activator 28 (FIG. 5) when an appropriately authorized user wishes to delete a user from device 10. In the preferred embodiment, delete user process 122 is classified in global software-restriction class 62 so that any user is authorized to delete a user. However, this is not a requirement and other classifications may be applied as well.

Delete user process 122 includes a task 154 that obtains the user ID of the user that is to be deleted. The user ID may be obtained from the user table 42 (FIG. 1) for the to-be-deleted user. Task 154 is preferably configured so that the virtual internal user cannot be deleted.

Following task 154, a task 156 destroys all split-keys 48 (FIG. 1) stored in the split-key register 46 (FIG. 1) of the to-be-deleted user's user table 42. When the to-be-deleted user's split-keys 46 have been destroyed, the to-be-deleted user's token will no longer be able to generate, within a reasonable degree of cryptographic certainty, a cipher-key that can successfully decrypt any software module 16, and the installation of the user has effectively been deleted from device 10. However, nothing prevents the now-deleted user from accessing licensed software modules 16 classified in global software-restriction class 62 (FIG. 3), or from accessing any licensed software module 16 should uncontrolled-access-control model 68 (FIG. 3) become active.

After task 156, a query task 158 determines whether the now-deleted user is the last user installed on device 10. So long as other external users remain installed on device 10, device 10 is automatically signaled to remain in the controlled-access-control model 70 that is now active. Consequently, program control exits delete user process 122 and returns to a calling routine, such as access-control-model-activator 28.

When task 158 discovers that the last user has just been deleted from secure device 10, a task 160 deactivates the controlled-access-control model 70 (FIG. 3) that is currently active and then activates uncontrolled-access-control model 68 (FIG. 3). Task 166 may be performed by recording an appropriate entry at an appropriate location in the memory space of processor 20 (FIG. 1). Presumably, this last user is the very same user that is currently logged on device 10. After task 160, program flow returns to a calling routine.

The access-control system implemented by device 10 and described above allows software to be managed in a beneficial manner throughout the lifecycle of the software. The software lifecycle would typically, but not necessarily, begin prior to delivery of device 10 to a customer and continue long after device 10 has been delivered to the customer. Moreover, this software lifecycle would apply to an entire population of devices similar to device 10.

Figure 7:
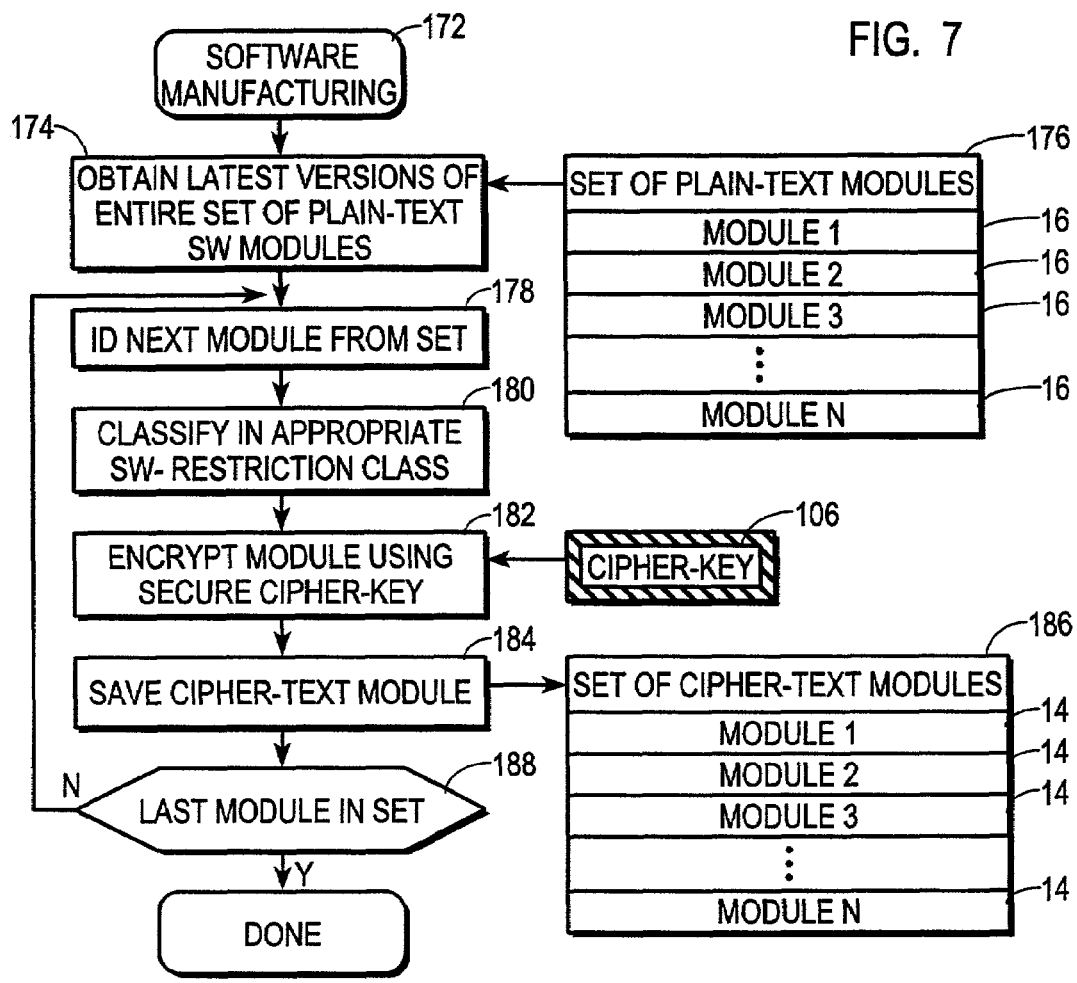
FIG. 7 shows a flow chart of a software manufacturing process that may be carried out by a manufacturer in connection with software to be loaded on the device of FIG. 1.

FIG. 7 shows a flow chart of a software manufacturing process 172 that may be carried out by a manufacturer in connection with software modules 16 to be loaded on device 10. Process 172 is performed prior to the delivery of device 10 to a customer, but may also be performed from time-to-time as needed with respect to new and/or revised software for device 10. Process 172 may be performed without respect to any single particular device 10 and without respect to which software modules 16 will be used on or licensed for use by any particular device 10.

Process 172 includes a task 174 during which the latest versions of an entire set 176 of plain-text software modules 16 are obtained. Entire set 176 may include unlicensed modules 18 (FIG. 1). Desirably, entire set 176 includes all software modules 16 that are or will be supported by the manufacturer for device 10 and may include a greater number of software modules 16 than will be licensed for any single device 10.

After task 174, software manufacturing process 172 as depicted in FIG. 7 operates in a loop, where one iteration of the loop is performed for each software module 16 in entire set 176. A task 178 in this loop identifies (ID) the next software module 16 in set 176 that has not been previously processed by software manufacturing process 172. Next, a task 180 classifies this software module 16 into an appropriate software-restriction class 58 (FIG. 3). Task 180 may occur interactively or otherwise in response to input from the engineers and designers of device 10, entire set 176, and the subject software module 16.

After task 180, a task 182 encrypts the subject software module 16 using a designated cipher-key 106. Cipher-key 106 is desirably a random number that is desirably maintained in a secure state by the manufacturer. Cipher-key 106 may itself be encrypted for storage by the manufacturer as cipher-text, decrypted into a plain-text cipher-key 106 for use by process 172, then the plain-text cipher-key 106 may be destroyed after task 182. In one preferred embodiment, during each performance of software manufacturing process 172, the same cipher-keys 106 are used to encrypt the same software modules 16 of entire set 176. In other words, a given software module 16 is encrypted using the same cipher-key 106 each time process 172 is performed. But nothing requires different software modules 16 to be encrypted using the same cipher-keys 106; and, in fact, different software modules 16 are encrypted using different cipher-keys 106 in the preferred embodiment. The consistent use of cipher-keys 106 provides benefits with respect to licensing previously unlicensed software modules 16 and upgrading software modules 16 after delivery of device 10, as discussed in more detail below.

After task 182, a task 184 saves the encrypted, cipher-text subject software module 14 formed by task 182. The subject software module 14 is saved in connection with an entire set 186 of cipher-text software modules 14. After task 184, a query task 188 determines whether the last software module 16 from entire set 176 has been encrypted. So long as additional software modules 16 remain in entire set 176, process flow loops back to task 178 to process an additional software module 16. When the last software module 16 has been encrypted, software manufacturing process 172 ends.

Figure 8:
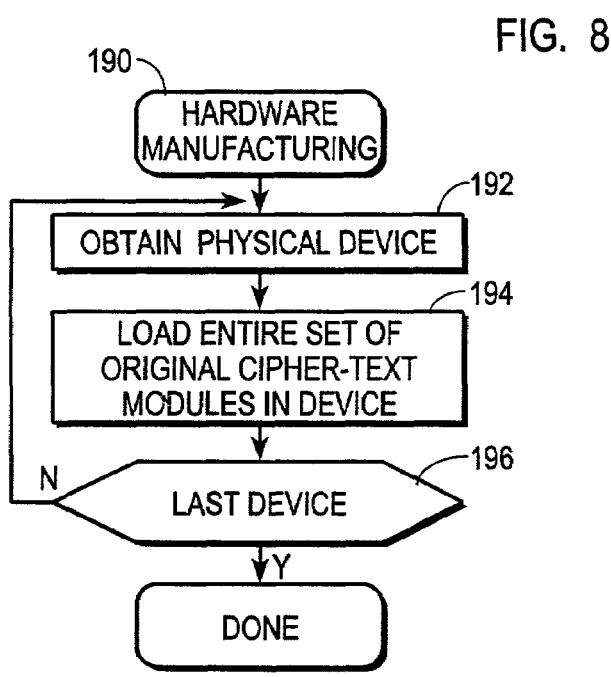
FIG. 8 shows a flow chart of a hardware manufacturing process that may be carried out by a manufacturer with respect to the device of FIG. 1.

FIG. 8 shows a flow chart of a hardware manufacturing process 190 that may be carried out by the manufacturer with respect to a batch that includes any number of programmable electronic devices 10. Hardware manufacturing process 190 is presumably carried out some time after a performance of software manufacturing process 172, and an entire set 186 (FIG. 7) of cipher-text software modules 14 are available for installation on devices 10.

Hardware manufacturing process 190 includes a task 192 in which a specific physical device 10 is obtained. Device 10 may be manufactured or assembled by this manufacturer, or device 10 may be purchased as a completed assembly by this manufacturer. However, device 10 need not have software installed thereon.

Next, a task 194 is performed to load entire set 186 of original cipher-text software modules 14 in device 10. At task 194, entire set 186 is considered to be original software modules 14 because these software modules 14 will be the ones originally delivered to a customer. These original software modules 14 may be contrasted with updated modules 14 that may be provided after delivery. Desirably, task 194 does nothing to load any cipher-key, split-key, or token-key in device 10. Consequently, at this point no information is present in device 10 with which to decrypt and use any software module 16, at least to a cryptographically reasonable degree of certainty. However, additional plain-text software may also be loaded in device 10 during task 194, and such plain-text software may very well be usable.

After task 194, a query task 196 determines whether original cipher-text software modules 14 have been loaded in the last device 10 in the batch of devices 10. So long as additional devices 10 remain, process flow loops back to task 192 to load entire set 186 in another device 10. When the last device 10 has been loaded, hardware manufacturing process 190 ends. Accordingly, through the performance of hardware manufacturing process 190, a plurality of devices 10 are configured so that each device 10 is loaded with entire set 186 of cipher-text software modules 14.

Figure 9:
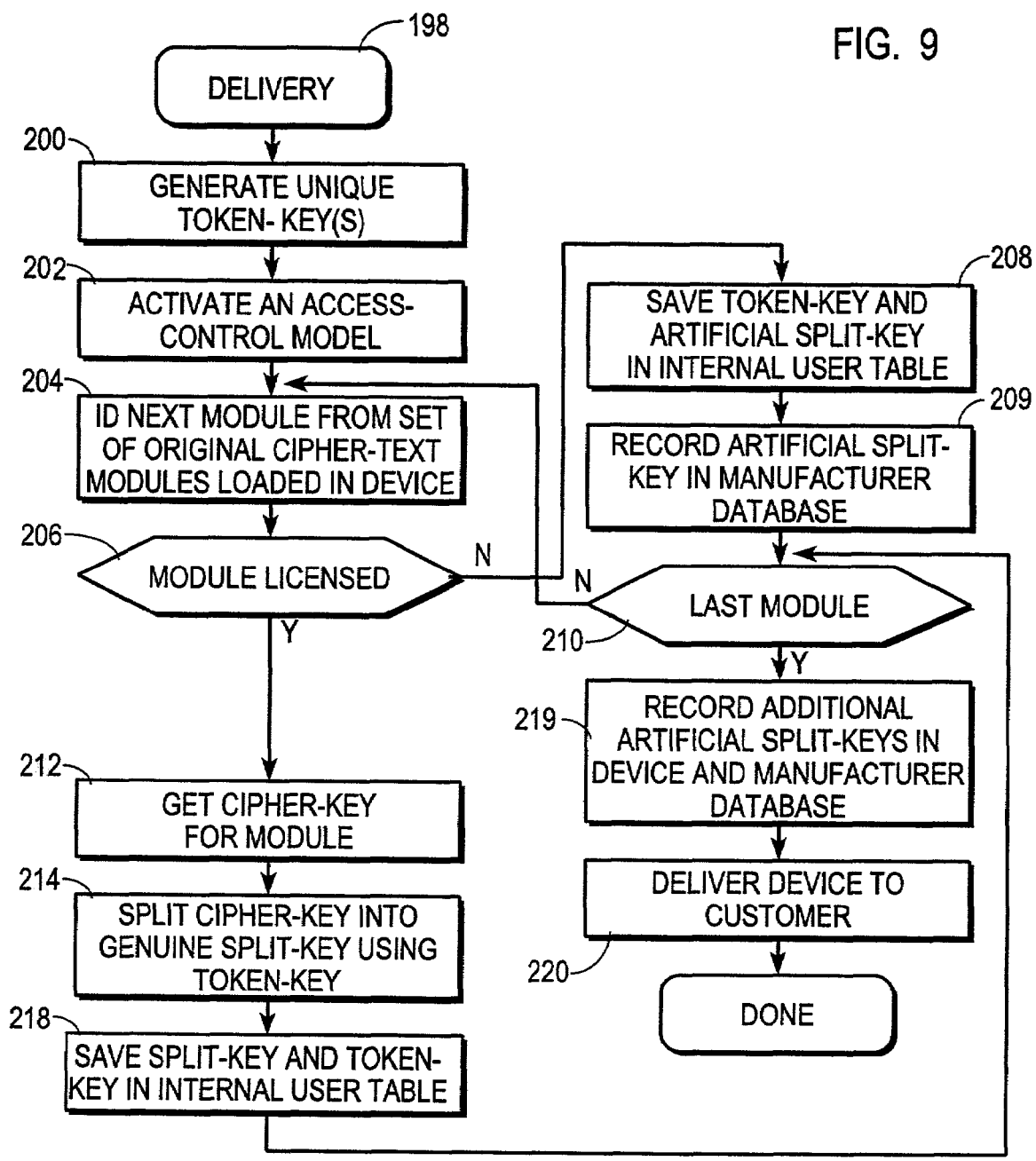
FIG. 9. shows a flow chart of a delivery process that may be carried out by a manufacturer with respect to the device of FIG. 1.

FIG. 9. shows a flow chart of a delivery process 198 that may be carried out by the manufacturer with respect to a specific device 10. Delivery process 198 may be repeated for each device 10 to be delivered within a population of customers. In general, delivery process 198 provisions device 10 so that at least some of cipher-text software modules 14 loaded therein are licensed to and usable by the customer that is to receive the device 10. Delivery process 198 is performed after hardware manufacturing process 190 (FIG. 8).

Delivery process 198 includes a task 200 which generates a unique token having a number of token-keys at least equal to the number of cipher-keys 106 used during software manufacturing process 172 (FIG. 7) to encrypt entire set 176 of original plain-text software modules 16. Desirably, task 200 uses a random number in generating its token, and the resulting token is unique to the device 10 for which it is generated. Of course, the token need only be unique to the extent that it is highly unlikely that another device 10 will get the same token.

Next, a task 202 activates a specified access-control model 60 (FIG. 3) for the subject device 10. Task 202 may be performed by recording an appropriate entry at an appropriate location in the memory space of processor 20 (FIG. 1). In the preferred embodiment, uncontrolled-access-control model 68 is activated at task 202. By activating uncontrolled-access-control model 68, device 10 will be immediately usable by the customer upon delivery. In other words, device 10 will be usable "out-of-the-box". As the customer becomes more familiar with the capabilities of device 10 and with its own security needs, a range of more restrictive access-control models 60 may be activated as discussed above. However, other access-control models 60 may be activated in task 202. For example, certain customers may prefer that the manufacturer to deliver device 10 with administered-controlled access-control model 74 active.

After task 202, delivery process 198 operates in a programming loop, with each iteration of the loop being dedicated to a different software module 14 included in entire set 186 (FIG. 7) loaded in device 10. This loop includes a task 204, which identifies the next original cipher-text software module 14 previously loaded in device 10. Next, a query task 206 determines whether this subject software module 14 is to be licensed for use on this device 10. The determination of task 206 may be made by obtaining information from an order-form document or the like. In one embodiment, a customer may wish to have device 10 delivered with certain security-critical software modules 14 classified as being unlicensed modules, even though that customer is otherwise entitled to access such modules. Such unlicensed modules may become licensed later through a licensing process, discussed below.

If the subject software module 14 is to be delivered as an unlicensed module, a task 208 saves a token-key generated above in task 200 and an artificial split-key 52 (FIG. 1) in user table 44 (FIG. 1) for the virtual internal user. The token-key and split-key are saved in a way that associates them with the subject software module 14 within device 10. The artificial split-key 52 may be generated by a random number generator and should share no cryptographically significant relationship with the token-key and the cipher-key 106 used in encrypting the subject software module 14.

Accordingly, the customer will have no key or other information within device 10 with which to form a cipher-key 106 that will allow the unlicensed subject software module 14 to be used on device 10.

Following task 208, a task 209 records the artificial split-key 52 generated above in task 208 in a secure database maintained by the manufacturer. Desirably, this artificial split-key 52 is saved in association with other identifying information, such as customer identity, device 10 serial number, and the like. The recorded artificial split-key saved by the manufacturer may be used later to license the subject software module 14.

After task 209, a query task 210 determines whether the subject software module 14 was the last software module 14 within entire set 186 (FIG. 7). So long as another software module 14 remains to be evaluated for licensing status, program flow returns to task 204.

When task 206 determines that a subject software module 14 is to be licensed for use on the subject device 10, a task 212 is performed. Task 212 gets the same cipher-key 106 (FIG. 7) that was used in software manufacturing process 172 (FIG. 7) to encrypt the subject software module 16. Then, a task 214 combines a token-key obtained above in task 200 with this cipher-key 106 to generate a genuine split-key 50. At the completion of task 214, cipher-key 106 may be destroyed or otherwise secured to preserve its security.

Since the token-key obtained in task 200 was unique to this device 10, the genuine split-key 50 will also be unique to this device 10. Consequently, within a population of devices 10, a token-key that combines with a genuine split-key 50 on one device 10 to enable access to a software module 16 will not combine with a corresponding genuine split-key 50 in another device 10 to enable access to the same software module 16. The manufacturer is assured that software modules 14 that have been licensed for use on one device 10 cannot be used on another device 10 for which it is not licensed, even though the software modules 14 are loaded on both devices 10 and even though users may share tokens. Likewise, if a user's token becomes compromised, that compromised token will not be usable on other devices 10.

After task 214, a task 218 saves the genuine split-key 50 generated above in task 214 and the token-key used in its generation in internal user table 44 (FIG. 1). Consequently, regardless of the software-restriction class 58 (FIG. 3) of the subject software module 14, the subject licensed software module 14 will be immediately usable on device 10 upon receipt by the customer because access will automatically be granted through the proxy of the virtual internal user. Following task 218, program flow proceeds back to task 210 to determine whether to stop processing software modules 14.

While uncontrolled-access-control model 68 is preferred for delivery process 198, nothing prevents a controlled-access-control model 70 from being initially specified. If a controlled-access-control model 70 is specified and the subject software module 14 is classified in constrained or administration software-restriction classes 64 and 66, then desirably only the genuine split-key 50 is saved, and it is saved in the user table 42 for user 1. The token-key is desirably not saved in device 10 but printed or otherwise saved outside device 10 for delivery to the customer separate from device 10. Moreover, another token-key is desirably generated and saved in internal user table 44 (FIG. 1) for such software modules 14, but a corresponding genuine split-key 50 is not saved in internal user table 44. This other token-key is included for potential future use only.

When task 210 eventually determines that the last software module 14 has been evaluated for licensing status, a task 219 generates and records additional artificial split-keys 52 in split-key register 47 (FIG. 1) of device 10 and in the secure database maintained by the manufacturer. The additional artificial split-keys 52 may be generated by a random number generator and should be unique to device 10 and share no cryptographically significant relationship with other token-keys and/or cipher-keys associated with device 10. Desirably, these additional artificial split-keys 52 are saved in the manufacturer database in association with other identifying information, such as customer identity, device 10 serial number, and the like. The recorded artificial split-keys saved by the manufacturer may be used later to license the subject software module 14.

After task 219, a task 220 is performed to deliver device 10 to the customer. After task 220, delivery process 198 ends with respect to the subject device 10. However, process 198 may be repeated for any number of devices 10, and nothing requires different devices 10 to be delivered separately to a common customer.

Figure 10:
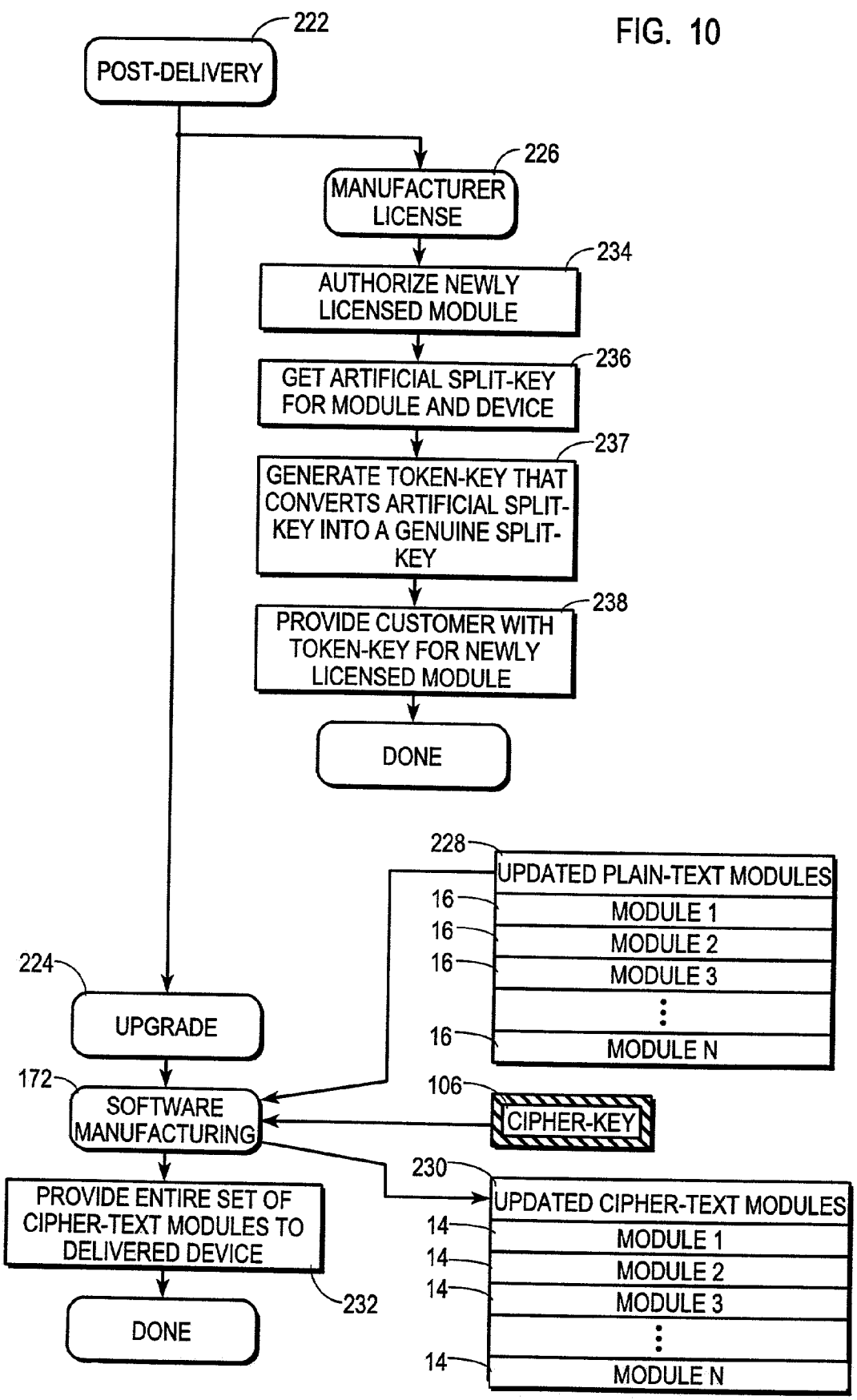
FIG. 10 shows a flow chart of a post-delivery process that may be carried out by a manufacturer with respect to the device of FIG. 1.

FIG. 10 shows a flow chart of a post-delivery process 222 that may be carried out by a manufacturer with respect to one or more devices 10. While process 222 may be performed at any time, it is most relevant to devices 10 that have been delivered to customers. Process 222 includes an upgrade sub-process 224 and a manufacturer license sub-process 226.

Upgrade sub-process 224 includes an iteration of software manufacturing process 172 (FIG. 7) using versions of one or more of plain-text software modules 16 that may have been generated following delivery of device 10 to the customer, and possibly including modules 16 that may not have been available in any version prior to the delivery of device 10. This iteration of software manufacturing process 172 may be performed without regard to any particular device 10, without regard to which software modules 14 have been licensed or unlicensed on any particular device 10, and without regard to which access-control model 60 (FIG. 3) may be activated on any particular device 10. During this post-delivery iteration of software manufacturing process 172, an entire set 228 of updated plain-text software modules 16 are encrypted using the same cipher-keys 106 that were used for corresponding software modules 16 from the original entire set 176 (FIG. 7). As a result of performing this iteration of software manufacturing process 172, an entire set 230 of updated cipher-text software modules 14 are produced.

Following process 172, a task 232 is performed to provide entire set 230 of updated cipher-text software modules 14 to a delivered device 10. Task 232 may be carried out by posting entire set 230 on an Internet web-site, by sending a CD ROM to the customer, or any other manner customary in the industry. Since entire set 230 is cipher-text and since it is not associated with the keys needed for decryption, security is maintained. Moreover, since updated entire set 230 is encrypted using the same cipher-keys 106 as were used with original entire set 186 (FIG. 7), it will be immediately usable on each device 10 in which it is installed in precisely the manner that is correct for that device 10. Software modules 14 that were previously loaded but unlicensed, will still be unavailable to users because the keys needed for their decryption are not available within device 10. Likewise, any changes in activated access-control models 60 (FIG. 3) or in externally-supplied tokens will be supported because such changes have taken place in a manner that maintained the consistent generation of those cipher-keys 106 that are successful in decrypting licensed software modules 14 in the various scenarios depicted in FIG. 3. Following task 232, upgrade sub-process 224 ends.

Manufacturer license sub-process 226 is used to license a particular unlicensed software module 18 (FIG. 1) for use on a particular device 10. Manufacturer license sub-process 226 includes a task 234 in which a newly licensed software module 16 is authorized. Task 234 may be carried out in response to receiving an order, collecting money, collecting identifying information, and the like.

After authorization of the newly licensed software module 16, a task 236 is performed to get the associated artificial split-key 52 loaded in device 10 for the subject module 16. This artificial split-key 52 is obtained from the manufacturer database, where it was saved during delivery process 198. If the subject software module was not originally delivered with device 10, then one of the additional artificial split-keys 52 saved in task 219 of delivery process 198 may be used instead.

Next, a task 237 generates a token-key 57 that will convert the artificial split-key 52 into a genuine split-key 50 for the subject module 16. The conversion of task 237 may be performed by combining the artificial split-key 52 obtained above in task 236 with the cipher-key 106 used to encrypt the subject module 16.

Following task 237, a task 238 provides the customer with the token-key 57 generated above in task 237. The token-key 57 may be provided in any convenient manner, and may desirably be encrypted prior to sending, then automatically decrypted by device 10 and saved therein. Manufacturer license sub-process 226 ends after task 238.

Figure 11:
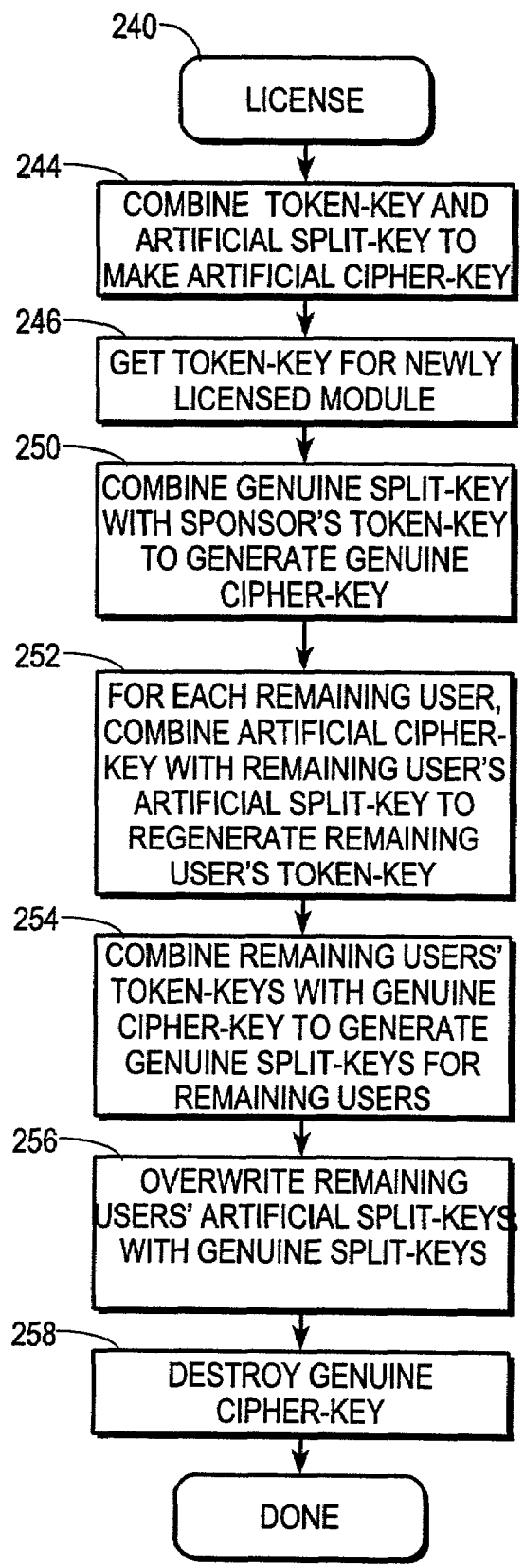
FIG. 11 shows a flow chart of an exemplary form of operation for a customer license process which may be performed by the device of FIG. 1 in support of the post-delivery process of FIG. 10.

FIG. 11 shows a flow chart of an exemplary form of operation for a customer license process 240 which may be performed by the device 10 of FIG. 1 in support of manufacturer license sub-process 226 (FIG. 10) performed by the manufacturer of device 10. In one preferred embodiment, customer license process 240 is itself included in a software module 16 classified in administration software-restriction class 66 (FIG. 3). License process 240 may therefore be activated in the appropriate scenario during activate module process 114 (FIG. 4).

Customer license process 240 includes a task 244 in which the current user of device 10 makes an artificial cipher-key. The artificial cipher-key is made by combining the current user's token-key and corresponding artificial split-key 52 for the subject module. This cipher-key is artificial because it does not successfully decrypt the newly licensed software module 16. However, artificial split-keys 52 were generated for this unlicensed software module 18 in connection with new users in the manner discussed above in FIG. 5. These artificial split-keys 52 were generated so that when combined with new users' token-keys this artificial cipher-key would result. Consequently, this artificial cipher-key is useful in synthesizing other user's token-keys even though the other users may be absent.

After task 244 a task 246 obtains the token-key 57 for the subject newly licensed software module 16. This token-key 57 is obtained from the manufacturer during task 238 (FIG. 10). The existence of this token-key 57 converts the heretofore artificial split-key 52 into a genuine split-key 50 without modifying the split-key 48. Following task 246, a task 250 combines the now-genuine split-key 50 with the sponsoring user's newly-obtained token-key 57 for the newly licensed software module 16 to generate a genuine cipher-key 106 that will enable successful decryption of the newly licensed software module 16. Next, a task 252 combines the artificial cipher-key generated above in task 244 with the artificial split-key 52 associated with other internal or external users of device 10, if there be any other users. This combination function regenerates the other user's token-keys for the newly licensed software module 16.

After task 252, for other users a task 254 combines the other users' regenerated token-keys with the genuine cipher-key 106 generated above in task 250 to generate genuine split-keys 50 for the other users. Next, a task 256 overwrites the artificial split-keys 52 of the other users with the genuine split-keys 50 generated above in task 254, and a task 258 destroys the genuine cipher-key 106. Following task 258, license process 240 ends. The newly licensed software module 16 is no longer an unlicensed module 18 and can now be successfully decrypted by various users of device 10 in the appropriate access-control scenarios.

In summary, an improved access-control method for software modules and programmable electronic device therefor are provided by the present invention. A flexible access-control system is provided which permits the device with which it is used to be operated over a range of security controls, from a permissive system that does not require tokens to a highly restrictive system wherein only certain user tokens are granted access to certain software modules. In addition, an access-control system is provided in which an entire set of software modules may be delivered to a customer, even though that customer is licensed to use only a subset of the entire set of software modules. The access-control system provides a manufacturer with assurance that software modules and permissions provided for one device are not usable on another device. Moreover, the access-control system enables the management of different versions of different software modules and the upgrading thereof in a manner that is user-friendly both for manufacturer and for the customers.

Although the preferred embodiments of the invention have been illustrated and described in detail, it will be readily apparent to those skilled in the art that various modifications and additions may be made therein without departing from the spirit of the invention or from the scope of the appended claims. For example, the access-control system described herein supports and enables numerous equivalent provisioning and licensing alternatives besides those described herein. In one such alternative, temporary licenses may be provided wherein genuine split-keys associated with certain software modules are destroyed at a certain future date. These and other alternatives and equivalents are intended to be included within the scope of the present invention.

What is claimed is:

1. A method of managing a plurality of software modules used in a programmable electronic device which selectively activates at least a portion of said plurality of software modules by controlling access to said software modules, said method comprising:

a) splitting a cipher-key into a split-key and a token-key wherein said split-key is a genuine split-key for licensed ones of said software modules and said split-key is an artificial split-key for unlicensed ones of said software modules;

b) encrypting each one of an entire set of original, plain-text software modules using said cipher-key to form cipher-text software modules;

c) loading said entire set of cipher-text software modules in said device;

d) delivering said device to a customer;

e) generating later versions of at least some of said original plain-text software modules to form updated plain-text software modules;

f) encrypting said updated plain-text software modules to generate updated cipher-text software modules; and g) upgrading said device after delivering said device to said customer by providing said entire set of software modules, said entire set including said updated cipher-text software modules.

2. A method as claimed in claim 1 wherein said delivering activity d) comprises providing at least one key configured to decrypt only a subset of said entire set of cipher-text original software modules so that said customer has no key with which to decrypt unlicensed ones of said cipher-text software modules loaded in said device.

3. A method as claimed in claim 2 additionally comprising:
   licensing, after said delivering activity, one of said unlicensed cipher-text software modules to said customer to identify a newly-licensed software module; and
   providing, after said delivering activity, said customer with a key with which to decrypt said newly-licensed software module.

4. A method as claimed in claim 1 wherein:
   said encrypting activity b) uses a first cipher-key; and
   said encrypting activity f) uses said first cipher-key.

5. A method as claimed in claim 1 wherein:
   said entire set of cipher-text software modules is loaded into each of a plurality of programmable electronic devices; and
   for each of said plurality of programmable electronic devices, said splitting activity a) splits said cipher-key into a unique split-key and a unique token-key so that a token-key usable for accessing one of said software modules on one of said a plurality of programmable electronic devices is not usable to access said one of said software modules on another of said plurality of programmable electronic devices.

6. A method as claimed in claim 1 wherein said delivering activity comprises providing at least one key configured to decrypt at least one of said entire set of cipher-text original software modules by saving said split-key in said device.

7. A method as claimed in claim 6 wherein:
   said delivering activity additionally comprises saving said token-key in said device; and
   said method additionally comprises, after said delivering activity, automatically granting said customer access to at least one of said plain-text software modules by combining said split-key and said token-key to form a regenerated cipher-key and using said regenerated cipher-key to decrypt at least one of said cipher-text software modules.

8. A method as claimed in claim 1 additionally comprising:
   classifying, prior to said delivering activity d), said plurality of software modules into software-restriction classes;
   activating one of a plurality of access-control models;
   receiving, after said delivering activity d), a request to access one of said plurality of software modules;
   evaluating said software-restriction class for said one of said plurality of software modules and said one of said plurality of access-control models to determine whether to grant access to said one of said plurality of software modules; and
   activating said one of said plurality of software modules when said evaluating activity determines to grant access to said one of said plurality of software modules.

9. A method as claimed in claim 8 wherein said activated one of said plurality of access-control models is a first access-control model, and said method additionally comprises:
   deactivating said first access-control model; and
   activating a second one of said plurality of access-control models.

10. A method as claimed in claim 8 wherein said plurality of access-control models includes an uncontrolled-access-control model for which no externally-supplied token is required to grant access to at least some of said software modules and a controlled-access-control model for which externally-supplied tokens are required to grant access to at least some of said software modules.

11. A method as claimed in claim 8 wherein said software-restriction classes include a global software-restriction class configured so that no externally-supplied token is required to grant access to said ones of software modules classified in said global software-restriction class regardless of which of said plurality of access-control models has been activated.

12. A method as claimed in claim 8 wherein said plurality of access-control models includes:
   an administered-controlled-access-control model configured so that an externally-supplied administrator token is required to grant access to ones of said software modules classified as being in an administration software-restriction class; and
   an unadministered-controlled-access-control model configured so that an externally-supplied common token is required to grant access to ones of said software modules classified as being in said administration software-restriction class.

13. A method as claimed in claim 8 wherein said plurality of access-control models further includes an uncontrolled-access-control model for which no externally-supplied token is required to grant access to said software modules classified as being in said administration software-restriction class.

* * * * *